Dec. 10, 1935.  S. TUROCY  2,023,797
ANTISHIMMY AND WEAR COMPENSATOR
Filed Oct. 5, 1933
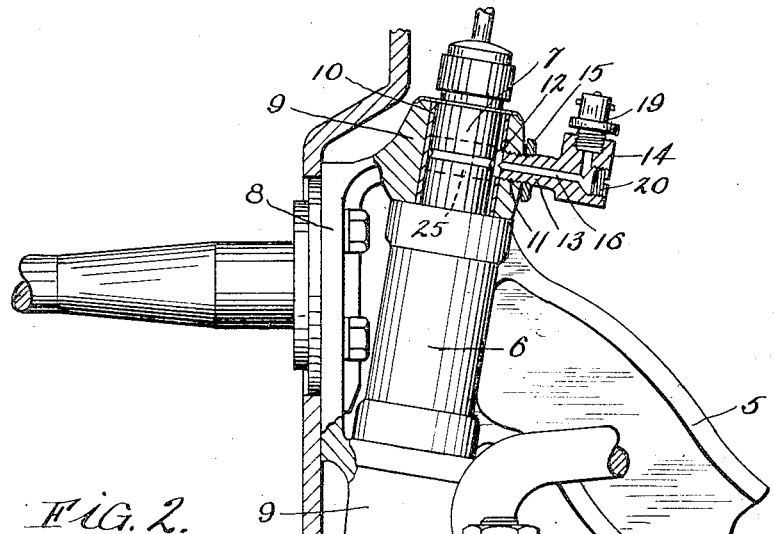
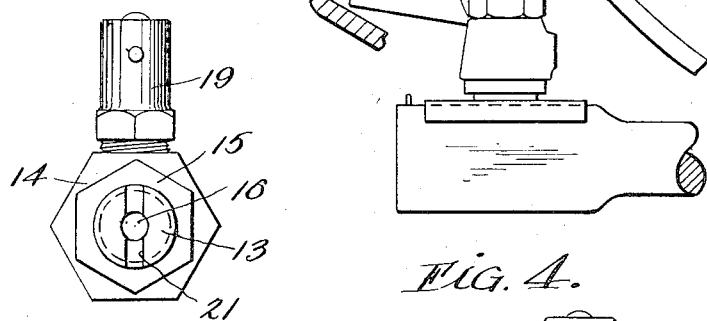
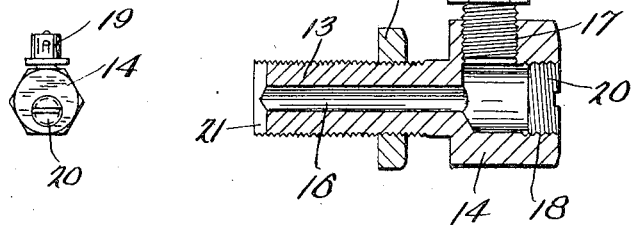
WITNESS
F.C. Butler
Fred H. Huge
INVENTOR
STEPHEN TUROCY.
BY
Louis W. Helmuth
ATTORNEY Patented Dec. 10, 1935

2,023,797

UNITED STATES PATENT OFFICE 2,023,797

ANTISHIMMY AND WEAR COMPENSATOR

Stephen Turocy, North Olmstead, Ohio

Application October 5, 1933, Serial No. 692,347

1 Claim. (Cl. 280—96.1)

This invention relates to new and useful improvements in devices primarily designed to eliminate the shimmy or lateral shake from the front ends of motor vehicles.

An important object of the invention is to provide a device of the above character which also prevents shaking or shimmying of the steering wheel and associated mechanism, compensates for wear occurring in the steering knuckles of vehicle front wheels and increases the life of the front springs of motor vehicles.

Another object of the invention is to provide the device of the above character with means for lubricating the journals of steering knuckles with present systems of lubrication.

A further object of the invention is to provide a device which is inter-changeable with present lubricating fittings for steering wheel knuckles and which is of a character that it can be installed and subsequently adjusted to take up additional wear as it occurs by anyone unskilled in mechanics in a very short interval of time.

Other objects and advantages of the invention will become apparent during the course of the following description.

In the accompanying drawing forming a part of the description and wherein like numerals are employed to designate like parts throughout the several views, Fig. 1 is a fragmentary section of a steering wheel knuckle for motor vehicles with the wear compensator applied thereto, Fig. 2 is an end elevation of the compensator, Fig. 3 is an end elevation of the outer end of the same, Fig. 4 is an enlarged longitudinal section of the compensator.

In motor vehicles of present designs, it is a well known fact that wear around king pins, bushings therefor and steering knuckles of the front wheels, produces play or clearance between these parts which results in the front wheels wobbling and having lateral play thereby setting up lateral wobble or shimmy of the entire front end of the motor vehicle as well as to set up shaking of the steering mechanism including jarring of the steering wheel. This sets up discomfiture to the driver and a sense of loss of control of the vehicle. In addition this lateral movement of the front end of the vehicle stresses the leaves of the front spring laterally and has a tendency to reduce their life.

To correct this evil, it has been customary to replace the bushings in the steering knuckle around the king pin which is not only a tedious and expensive job, but is unsatisfactory because of the bushing wearing down again in a short time requiring further repair and replacement.

Referring more particularly to the drawing wherein the present preferred form of invention is illustrated, the numeral 5 designates a front axle of an automobile with eye knuckles 6 at its ends in which king pins or journals 7 are fixed by any suitable means. The usual stub axle fork or clevis jaws 8 has its two bearing portions 9 provided with bushings 10 fitted on opposite ends of each king pin for oscillation about the axis thereof when the stub axles are turned for steering the vehicle. The usual steering mechanism is attached to the clevis for turning the same about the king pin. Threaded openings 11 are usually tapped through the clevis jaws to receive lubricant fittings and registering openings 12 are provided in the bushings to convey lubricant from the fittings to the king pins. Constant usage of the vehicle causes the bushings to wear down producing play between them and the king pins with the result that the front wheels begin to wobble laterally causing jerking of the steering wheel and shimmy of the front end of the vehicle, and it is a fairly expensive task to replace the bushings, which at best, soon wear down again to produce the same objections.

I propose to replace the lubricant fittings with lubricated thrust devices in the form of screws, each having a threaded shank 13 of a size to fit the openings 11 and 12, and a polygonal head 14 which can be gripped with a wrench for installation and adjustment. The screw is threaded into the opening 11 until the end of the shank passes through opening 12 in the bushing and directly engages the king pin to take up wear and to prevent wobble of the stub axle and wheel on the pin. It will be noted that the inner end of the shank 13 is reasonably flat or it may be slightly convex outwardly to make either a line or point contact with the king pin to reduce friction and the amount of effort required for steering. In this connection, the portions of the king pins which make contact with the inner ends of the shanks 13 may be hardened as at 25 or provided with a separate hardened surface attached thereto in any suitable manner. A jam nut 15 threads upon the shank of the screw to abut against the clevis jaw or knuckle to lock the screw in adjustment.

In order that the screw will also serve in the same capacity as the alemite fitting it replaces, the shank 13 is provided with an axial bore or lubricant passage 16 which terminates somewhat eccentrically within the head 14 in communication with tapped threaded openings 17 and 18 of the same size; the former extending from a side face of the head and substantially normal to the axial opening, while the latter extends substantially in alignment therewith. An alemite fitting 19 fits into either opening best suited to clear adjacent parts of the vehicle, while the other opening is closed by a screw plug 20. It will be noted that opening 18 is somewhat eccentric to the bore to leave sufficient material in the head for tapping the opening 17.

The inner end of the shank 13 is provided with a diametrical kerf or slot 21 crossing the axial bore 16 so as to insure outlet of lubricant from the bore even though the ends of the kerf may be deformed from pressure against the king pin or may be clogged with foreign matter. As additional wear occurs, the play can be taken up in a few seconds by simply loosening the jam nut and turning the screw further into the knuckle to press against the king pin after which the jam nut is tightened to maintain the new adjustment. The alemite fitting 19 may be replaced with a fitting having a lubricant pipe or conduit connection so that the king pins can be lubricated with lubricant coming from a suitable source of supply carried by the vehicle.

One screw for each king pin is sufficient, but two, one for each knuckle or clevis jaw 9 adjacent opposite ends of the pin creates steadier bearings. If the front axle is the type having forked ends with the stub axles each having an eye knuckle mounted on the king pin, one adjusting screw is sufficient and is threaded into the eye knuckle to dispose its inner end in direct thrust engagement with the king pin.

Several makes of automobiles have their clevis jaws or knuckles equipped with alemite screw plugs and to apply this invention to such vehicles the alemite fittings are simply removed and replaced by my wear compensating screws after which the alemite fitting taken from the clevis jaw or knuckle can be inserted in either of the openings 17 or 18 in the head of the screw. These screws are then simply driven home to move their inner ends into direct thrust engagement with the king pin after which the jam nut 15 is threaded up on the shank 13 until it firmly bears and locks against the clevis jaw or knuckle to maintain the adjustment of the screw. As further wear occurs, these jam nuts are simply loosened up and the screws are screwed in further to more firmly engage the king pins after which the jam nuts are again tightened to maintain the adjustment.

It is to be understood that various changes in the size, shape and arrangement of parts may be resorted to without departing from the scope of the appended claim.

I claim:

In a motor vehicle, a steering knuckle, a king pin mounted therein, a sub-axle having a knuckle mounted upon said pin, a screw threaded into one of said knuckles substantially normal to the axis of the pin and having its inner end in direct thrust engagement with the pin, said screw having a polygonal head and a longitudinal passage extending from its inner end into said head, a pair of tapped openings in the head, one substantially axially thereof and another substantially normal to the passage and both communicating with the lubricant passage in the head, a lubricant fitting screwed into one opening and a plug screwed into the other, said fitting and plug being inter-changeable.

STEPHEN TUROCY.